United States Patent
Imaoka (10) Patent No.: US 10,215,891 B2
(45) Date of Patent: Feb. 26, 2019

(54) PROJECTION DISPLAY APPARATUS AND METHOD OF PRODUCING SAID APPARATUS

(71) Applicant: Konica Minolta, Inc., Tokyo (JP)

(72) Inventor: Masayuki Imaoka, Izumiotsu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/780,575

(22) PCT Filed: Nov. 29, 2016

(86) PCT No.: PCT/JP2016/085261
§ 371 (c)(1),
(2) Date: May 31, 2018

(87) PCT Pub. No.: WO2017/094690
PCT Pub. Date: Jun. 8, 2017

(65) Prior Publication Data
US 2018/0348413 A1 Dec. 6, 2018

(30) Foreign Application Priority Data

Dec. 4, 2015 (JP) .................. 2015-237160

(51) Int. Cl.
*G02B 5/04* (2006.01)
*G02B 26/02* (2006.01)
(Continued)

(52) U.S. Cl.
CPC .............. *G02B 5/04* (2013.01); *G02B 5/005* (2013.01); *G02B 5/08* (2013.01); *G02B 26/02* (2013.01);
(Continued)

(58) Field of Classification Search
CPC .... G03B 21/008; G03B 21/28; G03B 21/142; G03B 21/208; G02B 5/04; G02B 5/005;
(Continued)

(56) References Cited

U.S. PATENT DOCUMENTS

2002/0176058 A1* 11/2002 Yasui .................. G02B 13/16
353/100
2006/0044654 A1* 3/2006 Vandorpe ................ G02B 5/04
359/834

FOREIGN PATENT DOCUMENTS

| JP | 2003-322822 A | 11/2003 |
| JP | 2006-308992 A | 11/2006 |
| WO | 2011/108077 A1 | 9/2011 |

OTHER PUBLICATIONS

Kazuhiro Kurisu et al. (2014) Latest DLP Technology and Emerging Applications, Media Technology and Applications, vol. 68, No. 7, pp. 527-531(9 pages).

(Continued)

*Primary Examiner* — Sultan Chowdhury
(74) *Attorney, Agent, or Firm* — Osha Liang LLP (57) ABSTRACT

A projection display apparatus includes: a micromirror device that reflects light on an image display surface to emit image light; a prism unit that bends an optical path of the image light emitted from the micromirror device; and a projection optical system that includes a diaphragm and that projects the image light emitted from the prism unit onto a screen, wherein the image display surface is formed with a plurality of micromirrors, and an image is formed on the image display surface through ON/OFF control on a tilt of a surface of each of the micromirrors and intensity modulation on incident light, the prism unit has an air gap tilted at a predetermined angle with respect to a principal ray of the image light emitted from the center of the image display surface, and the image light emitted from the micromirror device passes through the air gap.

8 Claims, 4 Drawing Sheets (51) Int. Cl.
    *G02B 5/08*   (2006.01)
    *G03B 21/14*  (2006.01)
    *H04N 5/74*   (2006.01)
    *G02B 5/00*   (2006.01)
    *G03B 21/56*  (2006.01)
(52) U.S. Cl.
    CPC ............... *G03B 21/14* (2013.01); *H04N 5/74* (2013.01); *G03B 21/56* (2013.01)
(58) Field of Classification Search
    CPC .......... G02B 5/045; G02B 5/74; H04N 9/315; H04N 9/3105; H04N 9/3152; H04N 9/3155
    See application file for complete search history.

(56) References Cited

OTHER PUBLICATIONS

Texas Instruments Incorporated. (2014) MEMS Basic Products DLP. DLP Technology. Japan (10 pages).
International Search Report issued in corresponding International Application No. PCT/JP2016/085261 dated Mar. 7, 2017, with translation (5 pages).
Written Opinion of the International Searching Authority issued in corresponding International Application No. PCT/JP2016/085261 dated Mar. 7, 2017 (3 pages).

\* cited by examiner

PROJECTION DISPLAY APPARATUS AND METHOD OF PRODUCING SAID APPARATUS

TECHNICAL FIELD

The present invention relates to a projection display apparatus and a method of producing the projection display apparatus. For example, the present invention relates to a one-chip projection display apparatus that includes a reflective image display element such as a digital micromirror device, and a method of producing the projection display apparatus.

BACKGROUND ART

In a projector of a DLP (digital light processing; a registered trademark of Texas Instruments Incorporated of the United States) system, image projection is performed with an optical semiconductor called a DLP chip containing millions of small mirrors (micromirrors). In the case of a three-chip DLP system that uses three DLP chips, lamp light is separated into the three primary colors of RGB with a specially designed prism, and each DLP chip is illuminated to display a color image. In the case of a one-chip DLP system that uses one DLP chip, on the other hand, lamp light is separated into the three primary colors of RGB with one color wheel colored in the three colors of RGB, and the one DLP chip is illuminated to display a color image. The color wheel rotates at high speed, and accordingly, the micromirrors are switched on and off at high speed. Therefore, the image appears to be an RGB combined color image to the human eye, due to an afterimage effect.

Digital micromirror devices such as the above mentioned DLP chips are already common as reflective image display elements for projectors. A digital micromirror device has an image display surface that is formed with a plurality of minute micromirrors, and controls the tilt of each mirror surface on the image display surface to perform intensity modulation on illumination light so that an image is formed. That is, switching on and off of each pixel of the digital micromirror device is performed by rotating the mirror surface ±12 degrees about the rotation axis at an angle of 45 degrees with respect to each side of the image display surface (in other words, micromirror drive being performed about one axis). As for movement of the micromirrors, Non Patent Literature 1 discloses a digital micromirror device of a new operation type (Tilt & Roll Pixel DMD) that performs micromirror drive about two orthogonal axes.

Various types of projectors have been suggested (see Patent Literatures 1 through 3, for example) as projectors equipped with reflective image display elements such as the above described digital micromirror device, and there is a demand for projectors that are bright (with small F-numbers), have high contrast, and have high image quality.

CITATION LIST

Patent Literature

Patent Literature 1: JP 2003-322822 A
Patent Literature 2: JP 2006-308992 A
Patent Literature 3: WO 2011/108077 A1

Non Patent Literature

Non Patent Literature 1: DLP(R) TRP pixel architecture and chipsets, Internet <URL: http://www.ti.com/lsds/ti/dlp/video-and-data-display/trp-technology.page#0.2>

SUMMARY

However, it is difficult to achieve both contrast and image quality while maintaining brightness. In the projection display apparatuses described in Patent Literatures 1 and 2, to improve contrast, the diaphragm disposed in the projection optical system is shaped to block interference portions between image light and unnecessary light. Further, in the projection display apparatus disclosed in Patent Literature 3, to improve contrast, the illumination light flux is formed in an elliptical shape, and the shape of the diaphragm of the projection optical system is also different from conventional ones. However, any of the techniques does not take into consideration the flare to be generated when the image light passes through the air gap, and a structure that can improve image quality in such a situation is yet to be developed.

One or more embodiments of the present invention provide a projection display apparatus in which contrast and image quality are improved by blocking unnecessary light and flare components while maintaining brightness, and a method of designing the projection display apparatus.

A projection display apparatus according to one or more embodiments of the present invention includes: a reflective image display element that emits image light through reflection on an illuminated image display surface;
a prism unit that bends the optical path of the image light emitted from the image display element; and a projection optical system that projects the image light emitted from the prism unit onto a screen.

In this projection display apparatus,
the image display surface is formed with a plurality of micromirrors, and an image is formed on the image display surface through ON/OFF control on the tilt of each micromirror surface and intensity modulation on illumination light,
the prism unit has an air gap tilted at a predetermined angle with respect to the principal ray of the image light emitted from the center of the image display surface, and the image light emitted from the image display element passes through the air gap,
the projection optical system has a diaphragm that has a non-circular opening in a shape formed by partially cutting off the peripheral portion of a circular opening with an arcuate light blocking portion, and the image light corresponding to the end portion of F-number light flux on a side having a large incident angle with respect to the air gap is blocked by the light blocking portion, and
the following conditional expressions (1) and (2) are satisfied.

$$0.9 \times Cg < G < 1.1 \times Cg \quad (1)$$

$$(0.2 - 0.05 \times F) < S < (1 - 0.2 \times F) \quad (2)$$

Where, of the emitted light subjected to the intensity modulation on the image display surface, light reflected by a micromirror in an ON-state is ON-light, light reflected by a micromirror in an OFF-state is OFF-light, the ON-light is the image light, and the plane including the principal ray of the illumination light immediately before entering the center of the image display surface and the principal ray of the ON-light immediately after reflection is the reference plane, $$Cg=\sin^{-1}(1/N)-(R-\sin^{-1}(1/(2F)))/N,$$

N: the refractive index on the d-line of a prism through which the image light passes, R: the angle (in degree) formed when the principal ray of the ON-light and the principal ray of the OFF-light immediately after reflection at the center of the image display surface are projected onto the reference plane, F: the smallest F-number of the projection optical system, G: the angle of the air gap with respect to a plane perpendicular to the principal ray of the image light emitted from the center of the image display surface, S: the light blocking rate forming the non-circular opening of the diaphragm (S=[the width of the arcuate portion of the light blocking portion (i.e., width of an arc of the light blocking portion) in the radial direction]/[the radius of the circular opening]), and

S>0.

A projection display apparatus according to one or more embodiments of the present invention is characterized in that, after the image light emitted from the image display element is totally reflected in the prism unit to bend the optical path, the image light passes through the air gap and is emitted from the prism unit to the aforementioned projection optical system.

A projection display apparatus according to one or more embodiments of the present invention is characterized in that the boundary between the non-circular opening and the light blocking portion of the diaphragm corresponds to the subtense of the arcuate portion, and forms a substantially straight line perpendicular to the aforementioned reference plane.

A projection display apparatus according to one or more embodiments of the present invention is characterized in that the aforementioned image display element is a single chip including a digital micromirror device.

A design method according to one or more embodiments of the present invention is a method of designing a projection display apparatus that includes: a reflective image display element that emits image light through reflection on an illuminated image display surface;

a prism unit that bends the optical path of the image light emitted from the image display element; and a projection optical system that projects the image light emitted from the prism unit onto a screen.

By the design method, the projection display apparatus is designed so that the image display surface is formed with a plurality of micromirrors, and an image is formed on the image display surface through ON/OFF control on the tilt of each micromirror surface and intensity modulation on illumination light, the prism unit has an air gap tilted at a predetermined angle with respect to the principal ray of the image light emitted from the center of the image display surface, and the image light emitted from the image display element passes through the air gap, the projection optical system has a diaphragm that has a non-circular opening in a shape formed by partially cutting off the peripheral portion of a circular opening with an arcuate light blocking portion, and the image light corresponding to the end portion of F-number light flux on a side having a large incident angle with respect to the air gap is blocked by the light blocking portion, and the following conditional expressions (1) and (2) are satisfied.

$$0.9 \times Cg < G < 1.1 \times Cg \qquad (1)$$

$$(0.2-0.05 \times F) < S < (1-0.2 \times F) \qquad (2)$$

Where, of the emitted light subjected to the intensity modulation on the image display surface, light reflected by a micromirror in an ON-state is ON-light, light reflected by a micromirror in an OFF-state is OFF-light, the ON-light is the image light, and the plane including the principal ray of the illumination light immediately before entering the center of the image display surface and the principal ray of the ON-light immediately after reflection is the reference plane, $$Cg=\sin^{-1}(1/N)-(R-\sin^{-1}(1/(2F)))/N,$$

N: the refractive index on the d-line of a prism through which the image light passes, R: the angle (in degree) formed when the principal ray of the ON-light and the principal ray of the OFF-light immediately after reflection at the center of the image display surface are projected onto the reference plane, F: the smallest F-number of the projection optical system, G: the angle of the air gap with respect to a plane perpendicular to the principal ray of the image light emitted from the center of the image display surface, S: the light blocking rate forming the non-circular opening of the diaphragm (S=[the width of the arcuate portion of the light blocking portion (i.e., width of an arc of the light blocking portion) in the radial direction]/[the radius of the circular opening]), and

S>0.

According to one or more embodiments of the present invention, a prism unit has a characteristic air gap, and a projection optical system has a characteristic diaphragm. With this design, unnecessary light (OFF-light, irregularly reflected light on the prism surface, and the like) is blocked in advance. Thus, while contrast is improved, flare components generated in the air gap is blocked so that image quality can be improved. Accordingly, it is possible to provide a projection display apparatus that has contrast and image quality improved by blocking unnecessary light and flare components while maintaining brightness.

DETAILED DESCRIPTION OF EMBODIMENTS

The following is a description of a projection display apparatus according to one or more embodiments of the present invention, with reference to the drawings. It should be noted that like components in one or more embodiments of the present invention are denoted by like reference numerals, and the same explanation will not be repeated.

Figure 1:
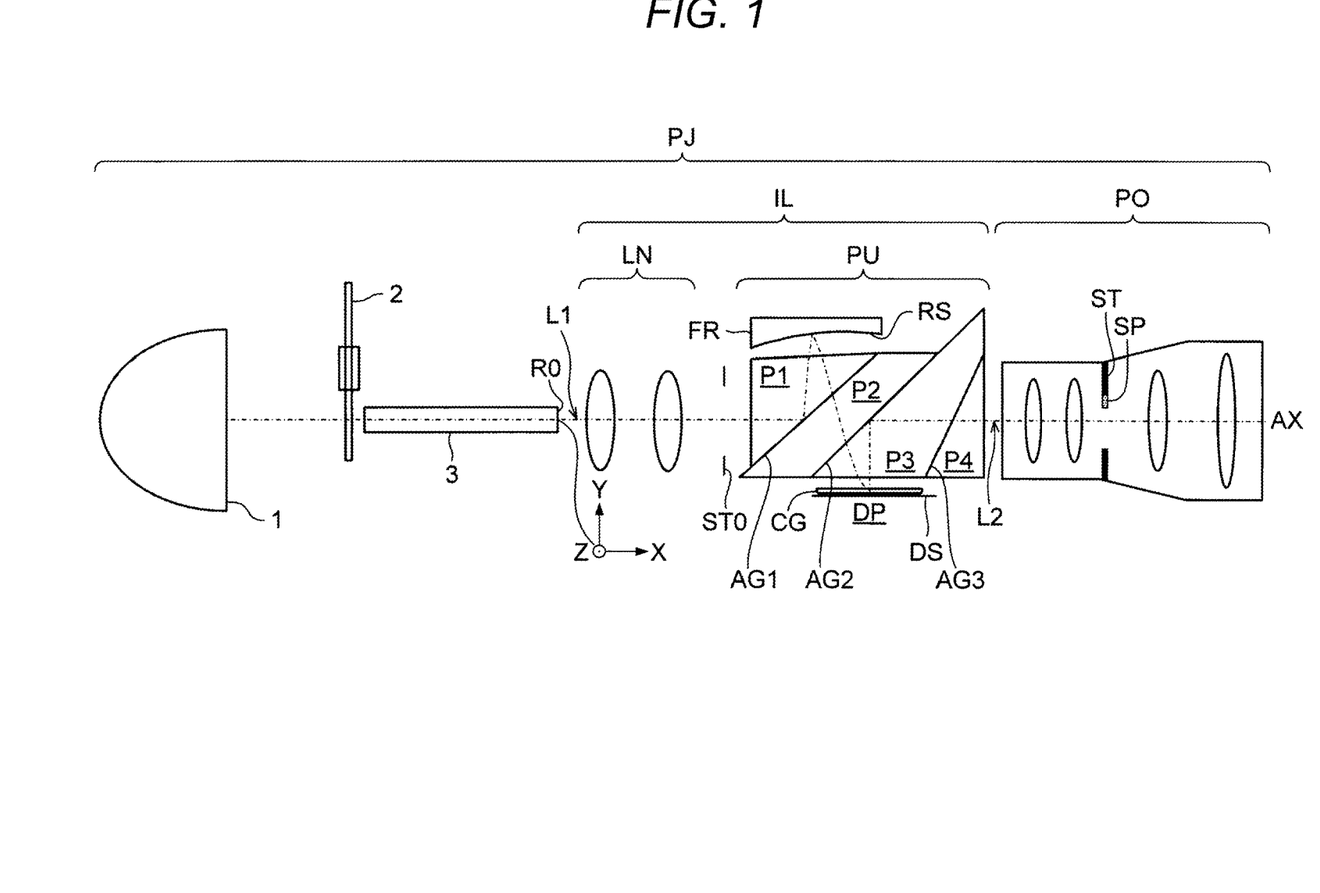
FIG. 1 is a schematic configuration diagram showing a projection display apparatus according to one or more embodiments of the present invention.

FIG. 1 shows a projector PJ of a one-chip type of a projection display apparatus according to one or more embodiments of the present invention. In FIG. 1, the global orthogonal coordinate system is an absolute coordinate system that coincides with a local orthogonal coordinate system (X, Y, Z) having its origin at the center of a rod exit surface R0, the X-direction is a direction parallel to a surface normal of the rod exit surface R0, and the Y-direction is a direction parallel to the short side of the rod exit surface R0. Accordingly, the paper surface of FIG. 1 is equivalent to the X-Y plane.

The projector PJ shown in FIG. 1 has a structure that includes a light source device 1, a color wheel 2, an integral rod 3, an illumination optical system IL, a projection optical system PO, and a digital micromirror device DP. The light source device 1 that generates illumination light L1 is a white light source such as a xenon lamp or a laser light source, for example. In the light source device 1, the light emission point is located at the focal position of the reflecting surface of a lamp reflector formed of an ellipsoidal surface, so that convergent light emitted from the light source device 1 enters the color wheel 2. The color wheel 2 is formed with three kinds of color filters that transmit color light of R (red), G (green), and B (blue). As the color wheel 2 is made to rotate, the illuminating color light sequentially changes with time, and the image information corresponding to each color is displayed on the digital micromirror device DP so that the projected image can be colorized.

Light flux having passed through the color wheel 2 enters the integral rod 3. The integral rod 3 being described herein is a light intensity equalizing element in the form of a hollow rod that is formed by bonding four plane mirrors. The illumination light L1 that has entered from the entrance-side end face (the rod entrance surface) of the integral rod 3 is mixed, being repetitively reflected by the side faces (or the inner wall surfaces) of the integral rod 3. As a result, the spatial energy distribution of the illumination light L1 is made uniform, and is emitted from the exit-side end face (the rod exit surface) R0.

The shape of the exit-side end face R0 of the integral rod 3 is a quadrangle (or may be a rectangle or a trapezoid) that is substantially similar to the image display surface DS of the digital micromirror device DP, and the exit-side end face R0 of the integral rod 3 is conjugate or substantially conjugate to the image display surface DS of the digital micromirror device DP. With this arrangement, the luminance distribution at the exit-side end face R0 is made uniform by the above mentioned mixing effect, so that the digital micromirror device DP is uniformly illuminated with high efficiency.

The integral rod 3 is not necessarily a hollow rod, but may be a glass rod formed with a glass structure having the shape of a quadrangular prism. Further, the number of the side surfaces of the integral rod 3 is not necessarily four, as long as the shape of the integral rod 3 matches the shape of the image display surface DS of the digital micromirror device DP. That is, the cross-sectional shape of the integral rod 3 is not necessarily a quadrangle such as a rectangle or a trapezoid. Therefore, the integral rod 3 to be used may be a hollow cylinder formed by combining a plurality of reflecting mirrors, a glass structure having the shape of a polygonal column, or the like.

The illumination light L1 emitted from the exit-side end face R0 of the integral rod 3 enters the illumination optical system IL disposed behind the integral rod 3. The illumination optical system IL is a catadioptric system that guides the incident illumination light L1 to the digital micromirror device DP, and illuminates the image display surface DS thereof. The illumination optical system IL includes a lens unit LN for condensing the illumination light L1, a diaphragm ST0 for performing flux regulation on the illumination light L1 emitted from the lens unit LN, and a prism unit PU for guiding the illumination light L1 emitted from the diaphragm ST0 to the digital micromirror device DP, and makes the exit-side end face R0 of the integral rod 3 and the image display surface DS conjugate or almost conjugate to each other. It should be noted that the optical path in FIG. 1 indicates the central principal ray (which corresponds to the optical axis AX and extends through the center of the image display surface DS) of the illumination light L1 and image light L2.

The illumination light L1 that has entered the illumination optical system IL is condensed by the lens unit LN, and is subjected to flux regulation by the diaphragm ST0. After that, the illumination light L1 is guided to the digital micromirror device DP by the prism unit PU, and illuminates the image display surface DS thereof. In one or more embodiments of the present invention, the diaphragm ST0 is disposed between the lens unit LN and the prism unit PU. However, the position of the diaphragm ST0 is not limited to this, and may be disposed in accordance with the optical design. For example, the diaphragm ST0 may be disposed in the lens unit LN, or the diaphragm ST0 may be disposed in the prism unit PU.

The prism unit PU includes a first prism P1, a second prism P2, a third prism P3, a fourth prism P4, and a reflecting optical element FR. The first prism P1 and the fourth prism P4 each have the shape of a triangular prism extending in the Z-direction (a direction perpendicular to the paper surface in FIG. 1), and the second prism P2 and the third prism P3 each have the shape of a quadrangular prism extending in the Z-direction. The prism unit PU also has a curved reflecting surface RS in the reflecting optical element FR.

The second prism P2 is disposed between the first prism P1 and the third prism P3, an air gap AG1 is formed between the first prism P1 and the second prism P2, and an air gap AG2 is formed between the second prism P2 and the third prism P3. In other words, the second prism P2 has the air gap AG1 between itself and the first prism P1, and has the air gap AG2 between itself and the third prism P3. Therefore, the two air gaps AG1 and AG2 are provided for total reflection between the first and third prisms P1 and P3.

An air gap AG3 is formed between the third prism P3 and the fourth prism P4. As will be described later, the air gap AG3 is tilted by a predetermined angle G with respect to the central principal ray L2$p$ (FIG. 3) of the image light L2 emitted from the center of the image display surface DS, and transmits the image light L2. However, the air gap AG3 is not designed to totally reflect the image light L2, but totally reflects OFF-light L3 (FIG. 4) and blocks light so that the OFF-light L3 does not enter the projection optical system PO.

The illumination light L1 emitted from the diaphragm ST0 enters the first prism P1, is totally reflected by the prism surface in contact with the air gap AG1, exits the first prism P1, and is reflected by the curved reflecting surface RS of the reflecting optical element FR. The reflecting optical element FR in the prism unit PU is a so-called free-form surface mirror. The reflecting optical element FR is disposed in the vicinity of the first prism P1, and has the rotationally asymmetrical curved reflecting surface RS that has a positive power (power: an amount defined by the reciprocal of the focal length). The illumination light L1 reflected by the curved reflecting surface RS reenters the first prism P1, passes through the air gap AG1, and enters the second prism P2. It should be noted that the reflecting optical element FR is not necessarily a free-form surface mirror, and may be a spherical mirror, a rotationally symmetrical aspherical mirror, or a rotationally asymmetrical free-form surface mirror.

The illumination light L1 that has entered the second prism P2 exits the second prism P2 without being reflected, passes through the air gap AG2, and enters the third prism P3. The illumination light L1 that has entered the third prism P3 exits the third prism P3 without being reflected, passes through a cover glass CG, and reaches the image display surface DS of the digital micromirror device DP. The image light L2 obtained through the reflection of the illumination light L1 on the image display surface DS enters the third prism P3, is totally reflected by the prism surface in contact with the air gap AG2, and is emitted to the outside of the third prism P3. After passing through the air gap AG3 and the fourth prism P4, the image light L2 enters the projection optical system PO.

The digital micromirror device DP is a reflective image display element that modulates light and generates an image, and includes the image display surface DS for forming a two-dimensional image through intensity modulation of the illumination light L1, and the cover glass CG disposed on the image display surface DS. The pixels of the well-known digital micromirror device DP have a rotation axis at an angle of 45 degrees with respect to each side of the rectangular image display region formed by the image display surface DS, and expresses switching on and off by rotating ±12 degrees about the axis, for example. Only light reflected by micromirrors in the ON-state passes through the projection optical system PO. In the case of a digital micromirror device of a new operation type suitable for the illumination optical system IL (see Non Patent Literature 1 and others), on the other hand, the mirror surface does not rotate about one rotation axis but rotates about two rotation axes orthogonal to each other.

Figure 2:
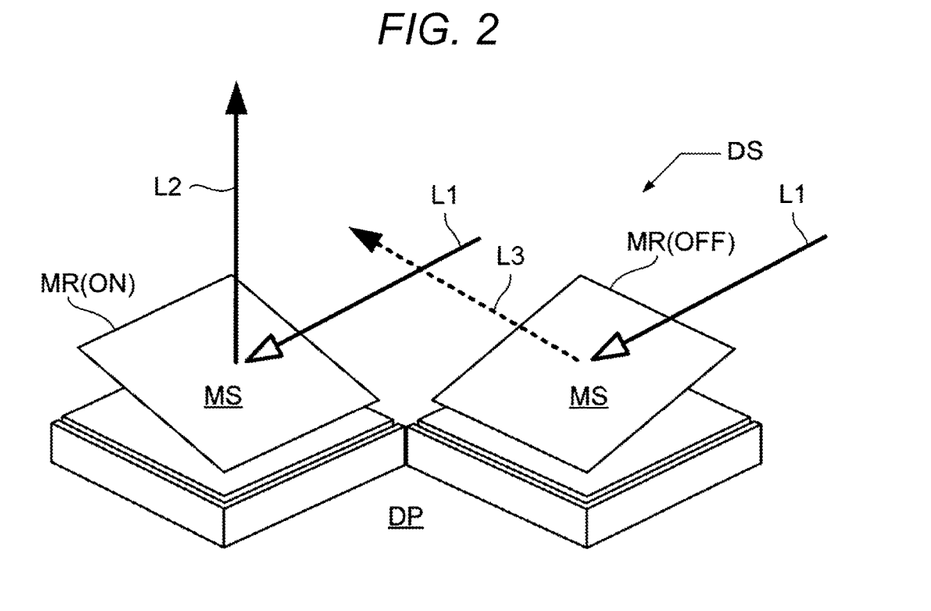
FIG. 2 is a perspective view for explaining an operation of a digital micromirror device that performs micromirror drive with respect to two orthogonal axes according to one or more embodiments of the present invention.

FIG. 2 shows the ON-state and the OFF-state of a principal component of a digital micromirror device DP of the new operation type, that is, a pixel having a micromirror MR formed with a rectangular pixel reflection surface (micromirror surface) MS. The image display surface DS is formed with a plurality of micromirrors MR, and the tilt of each micromirror surface MS is subjected to ON/OFF control on the image display surfaces DS so that an image is formed through intensity modulation of the illumination light L1. That is, in this digital micromirror device DP, each pixel reflection surface MS is subjected to ON/OFF control on the image display surface DS formed with a plurality of pixel reflection surfaces MS, and the micromirrors MR are in an image display state (ON-state) and a non-image display state (OFF-state) that are two states with different angles. In this manner, a desired image can be formed through intensity modulation of the illumination light L1.

As the micromirror drive is performed with respect to two orthogonal axes as described above, the pixel reflection surface MS of a micromirror MR is in the ON-state when the pixel reflection surface MS is tilted toward one side, and is in the OFF-state when the pixel reflection surface MS is tilted toward a side orthogonal to the one side, as can be seen from FIG. 2. In the normal ON/OFF control, when the pixel reflection surface MS is in the ON-state, the illumination light L1 that has entered the micromirror MR is reflected in the normal direction of the image display surface DS, and turns into the ON-light (image light) L2. When the pixel reflection surface MS is in the OFF-state, on the other hand, the illumination light L1 that has entered the micromirror MR is reflected in a direction at a large angle to the normal direction of the image display surface DS, and turns into OFF-light (unnecessary light) L3.

Figure 3:
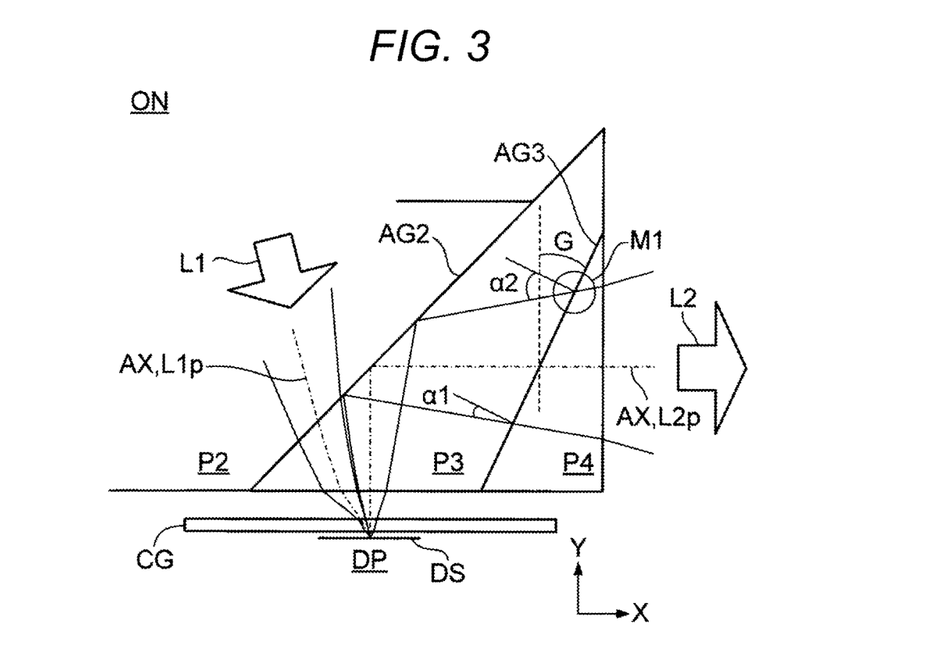
FIG. 3 is an optical path diagram showing the optical path of ON-light reflected by a micromirror in an ON-state in the digital micromirror device according to one or more embodiments of the present invention.

FIG. 3 shows the optical path of the on-axis light flux of the ON-light L2. When the image display surface DS of the digital micromirror device DP is illuminated with the illumination light L1, the ON-light L2 exits the digital micromirror device DP through reflection from the illuminated image display surface DS, and the optical path is bent by total reflection in the air gap AG2 in the prism unit PU. At this stage, the central principal ray L2$p$ exits substantially perpendicularly to the image display surface DS, and is totally reflected at a substantially right angle. The ON-light L2 then passes through the air gap AG3 tilted by an angle G with respect to the optical axis AX, and exits the prism unit PU. The ON-light L2 then enters the projection optical system PO, and is projected onto the screen. It should be noted that the upper end of the air gap AG3 is set above the upper limit position that does not block the ON-light L2 according to one or more embodiments of the present invention.

Figure 6:
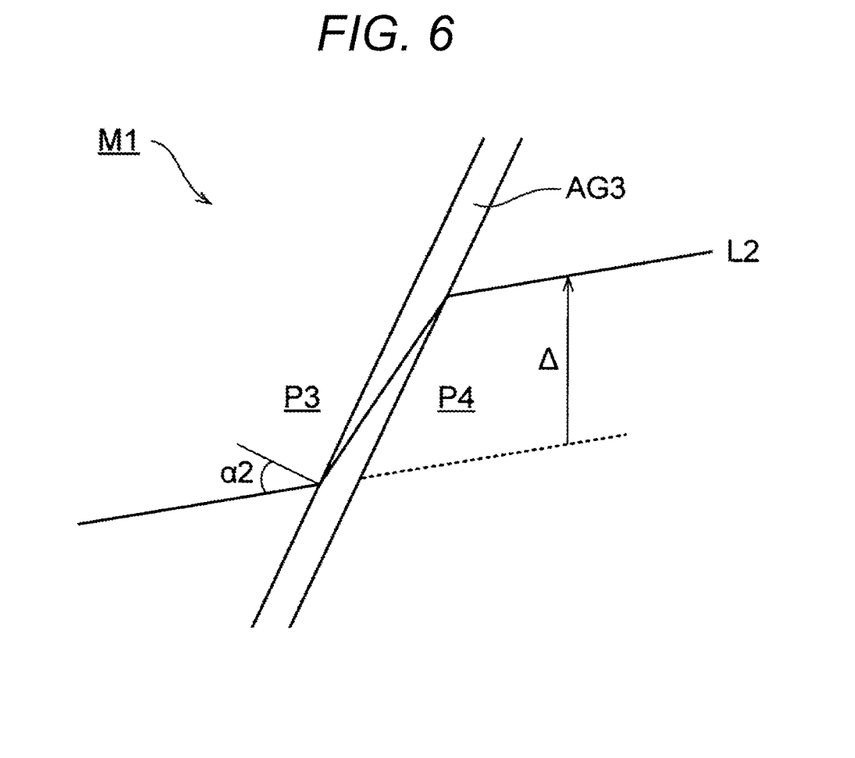
FIG. 6 is an enlarged optical path diagram of a relevant part M1 shown in FIG. 3.

Of the ON-light L2, the light ray that enters the air gap AG3 at an incident angle $\alpha 2$ is greatly tilted with respect to the air gap AG3, and therefore, is greatly refracted in the air gap AG3. An enlarged view of the principal portion M1 where the refraction occurs is shown in FIG. 6. As shown in FIG. 6, of the ON-light L2, the light ray that has entered the air gap AG3 at the incident angle $\alpha 2$ is greatly refracted in the air gap AG3. The flare component $\Delta$ caused by this refraction causes flare at the time of image formation by the projection optical system PO. It should be noted that the direction of the flare component $\Delta$ is parallel to the screen surface, and the flare is evaluated as the distance on the screen surface.

Figure 4:
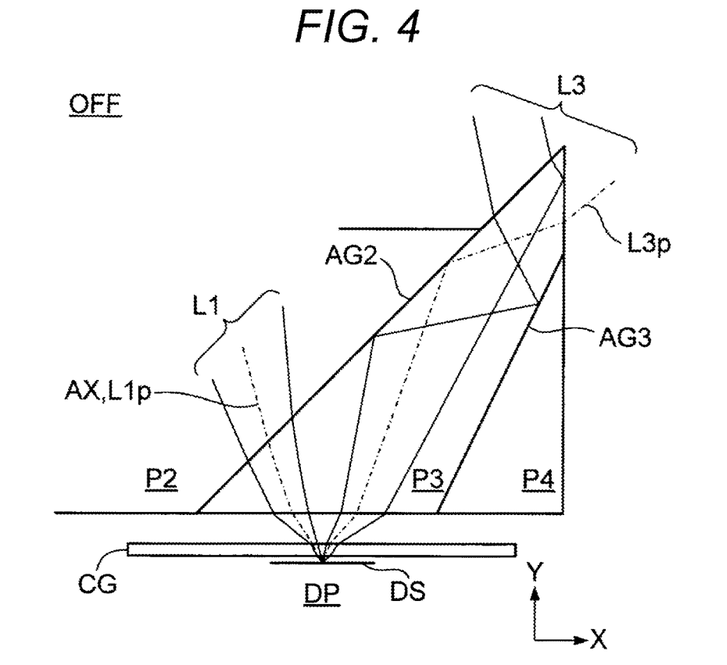
FIG. 4 is an optical path diagram showing the optical path of OFF-light reflected by a micromirror in an OFF-state in the digital micromirror device according to one or more embodiments of the present invention.
Figure 7:
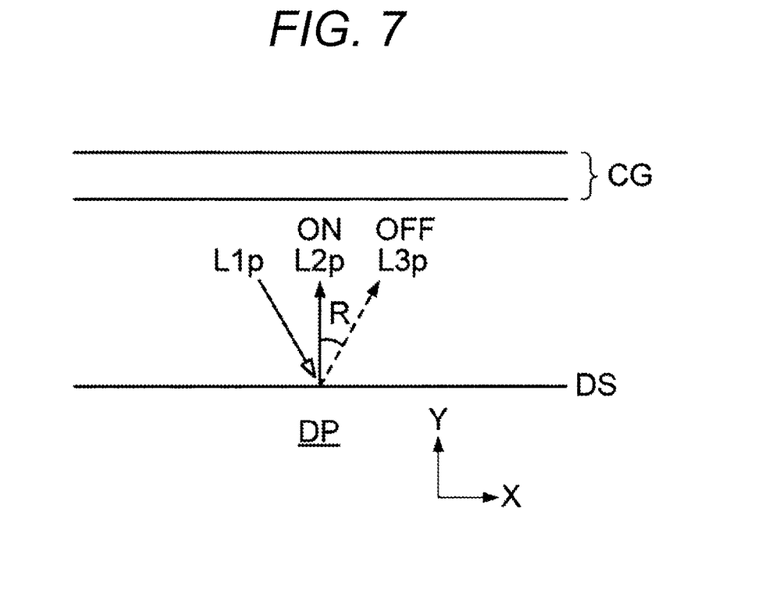
FIG. 7 is a diagram for explaining a separation angle R between ON-light and OFF-light according to one or more embodiments of the present invention.

FIG. 4 shows the optical path of the on-axis light flux of the OFF-light L3. When the image display surface DS of the digital micromirror device DP is illuminated with the illumination light L1, the OFF-light L3 exits the digital micromirror device DP through reflection from the illuminated image display surface DS. At this stage, the principal ray L3$p$ of the OFF-light L3 forms an angle R with respect to the principal ray L2$p$ of the ON-light L2 immediately after reflection at the center of the image display surface DS, and the OFF-light L3 is separated from the ON-light L2, as shown in FIG. 7.

For example, of the OFF-light L3 (FIG. 4), the light ray that is totally reflected in the air gap AG2, is further totally reflected in the air gap AG3, and is emitted in a direction away from the projection optical system PO should enter the projection optical system PO, if the air gap AG3 does not exist. That is, with the air gap AG3, it is possible to block unnecessary light such as the OFF-light L3 and irregularly reflected light on the prism surface in advance. Therefore, in the prism unit PU, the air gap AG3 is designed so that the OFF-light L3 exits the prism unit PU without being reflected in the air gap AG2, or even if reflected in the air gap AG2, the off-light L3 exits the prism unit PU without passing through the air gap AG3. Because of this, the OFF-light L3 does not enter the projection optical system PO, and is not projected onto the screen. As a result, only the ON-light L2 is projected. Thus, a high-contrast image is projected and displayed on the screen.

Figure 5:
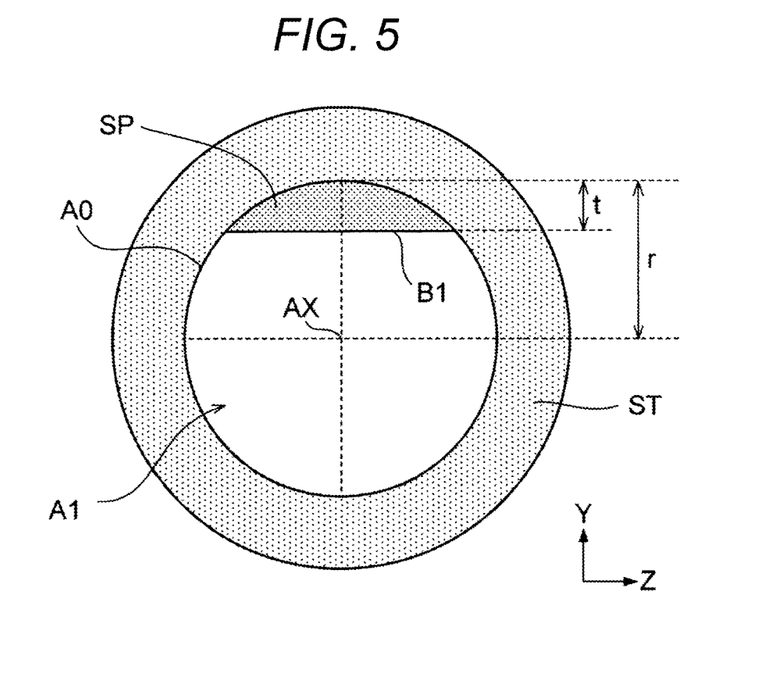
FIG. 5 is a plan view of a diaphragm having a non-circular opening according to one or more embodiments of the present invention.

In the projection optical system PO, a diaphragm ST having a light blocking portion SP is provided, as shown in FIG. 1. As shown in FIG. 5, the diaphragm ST has a non-circular opening A1 having a shape formed by the arcuate light blocking portion SP cutting off a peripheral portion of a circular opening A0. In the F-number light flux, the image light L2 corresponding to the end portion on the side having a larger incident angle with respect to the air gap AG3 (the side of the incident angle $\alpha 2$, $\alpha 1 < \alpha 2$) is blocked by the light blocking portion SP. That is, the light blocking portion SP is provided in the diaphragm ST of the projection optical system PO so as to block any light ray of the ON-light L2 entering the air gap AG3 at the large incident angle $\alpha 2$. With this arrangement, the flare component $\Delta$ (FIG. 6) is blocked. Thus, flare is eliminated from the projected image, and high image quality can be achieved.

To improve contrast and image quality by blocking unnecessary light and flare components while maintaining brightness, the projector PJ has the characteristic air gap AG3 in the prism unit PU and the characteristic diaphragm ST in the projection optical system PO. That is, the projector PJ is designed to satisfy the following conditional expressions (1) and (2).

$$0.9 \times Cg < G < 1.1 \times Cg \quad (1)$$

$$(0.2 - 0.05 \times F) < S < (1 - 0.2 \times F) \quad (2)$$

However, of the outgoing light subjected to intensity modulation on the image display surface DS, the light reflected by the micromirror MR in the ON-state is regarded as the ON-light (image light) L2, the light reflected by the micromirror MR in the OFF-state is regarded as OFF-light L3, and the plane including the principal ray L1$p$ of the illumination light L1 immediately before entering the center of the image display surface DS and the principal ray L2$p$ of the ON-light L2 immediately after its reflection is regarded as a reference plane (equivalent to the X-Y plane, which is the paper surface of each of FIGS. 1, 3, and 4). In this case, $$Cg = \sin^{-1}(1/N) - (R - \sin^{-1}(1/(2F)))/N,$$

N: the refractive index on the d-line of the prisms P3 and P4 through which the image light L2 passes, R: the angle formed when the principal ray L2$p$ of the ON-light L2 and the principal ray L3$p$ of the OFF-light L3 immediately after reflection at the center of the image display surface DS are projected onto the reference plane (the unit is degree, and the angle R is shown in FIG. 7), F: the smallest F-number of the projection optical system PO, G: the angle of the air gap AG3 with respect to a plane perpendicular to the principal ray L2$p$ (the optical axis AX) of the image light L2 emitted from the center of the image display surface DS (the unit is degree, and the angle G is shown in FIG. 3), S: the light blocking rate forming the non-circular opening A1 of the diaphragm ST, S=t/r (t represents the width of the arcuate portion of the light blocking portion SP in the radial direction, and r represents the radius of the circular opening A0, t and r being shown in FIG. 5), and

S>0.

The conditional expression (1) defines the appropriate angle G of the air gap AG3, and the conditional expression (2) defines the appropriate size of the light blocking portion SP in the diaphragm ST (the smaller the F-number, the higher the light blocking rate S). Where the air gap AG3 provided in the projection optical path satisfies the conditional expression (1), the image light L2 is transmitted while unnecessary light (the OFF-light L3 and the like in FIG. 4) other than the image light L2 is blocked by total reflection and the like. Thus, unnecessary light can be prevented from entering the projection optical system PO, and contrast can be improved. Since the air gap AG3 is tilted with respect to the optical axis AX (FIG. 3), coma aberration occurs, and the flare component $\Delta$ might be generated, as shown in FIG. 6 (an enlarged view of a relevant portion M1 in FIG. 3). The flare component $\Delta$ is more likely to be generated in a case where the angle G of the air gap AG3 is large, the refractive index N is high, and the F-number is small. However, as the light blocking portion SP that satisfies the conditional expression (2) is provided in the diaphragm ST of the projection optical system PO (FIGS. 1 and 5), the flare component $\Delta$ generated in the air gap AG3 can be removed without lowering brightness more than necessary, and thus, image quality can be increased.

If the angle G becomes smaller than the lower limit defined by the conditional expression (1), unnecessary light is not completely removed, and contrast tends to decrease. If the angle G exceeds the upper limit defined by the conditional expression (1), a large flare component $\Delta$ due to the air gap AG3 is generated, and image quality tends to deteriorate. If the size of the light blocking portion SP becomes smaller than the lower limit defined by the conditional expression (2), the flare component $\Delta$ is not completely removed, and the image quality tends to deteriorate. If the size exceeds the upper limit defined by the conditional expression (2), the image light L2 is blocked more than necessary, and therefore, brightness tends to decrease.

To form a structure that satisfies the conditional expressions (1) and (2), the following example values may be set:

$$N = 1.713,$$

$$R = 34,$$

$$F = 1.7,$$

$$Cg = 25.8532,$$

$$G = 25.5 (= 0.986 \times Cg), \text{ and}$$

$$S = 0.3.$$

Where these values are assigned to the conditional expression (1):

$$0.9 \times Cg < G < 1.1 \times Cg,$$

the following expression is obtained:

$$0.9 \times 25.8532 < 0.986 \times 25.8532 < 1.1 \times 25.8532,$$

$$23.268 < 25.5 < 28.439.$$

Where these values are assigned to the conditional expression (2):

$$(0.2 - 0.05 \times F) < S < (1 - 0.2 \times F),$$

the following expression is obtained:

$$(0.2-0.05\times1.7)<0.3<(1-0.2\times1.7),$$

$$0.115<0.3<0.66.$$

In the above described structure of the projector PJ, the prism unit PU has the characteristic air gap AG3, and the projection optical system PO has the characteristic diaphragm ST. With this, unnecessary light (the OFF-light L3, irregularly reflected light on the prism surface, and the like) is blocked in advance. Thus, while contrast is improved, the flare component Δ generated in the air gap AG3 is blocked so that image quality can be improved. Accordingly, it is possible to improve contrast and image quality by blocking unnecessary light and the flare component Δ while maintaining brightness.

According to one or more embodiments of the present invention, the following conditional expression (1a) is satisfied:

$$0.95\times Cg<G<1.05\times Cg \quad (1a)$$

The conditional expression (1a) defines a more appropriate condition range based on the above viewpoint and the like, among the conditional ranges defined by the conditional expression (1). Where the conditional expression (1a) is appropriately satisfied, the above described effect can be further increased.

According to one or more embodiments of the present invention, the following conditional expression (2a) is satisfied:

$$(0.53-0.2\times F)<S<(0.85-0.26\times F) \quad (2a)$$

The conditional expression (2a) defines a more appropriate condition range based on the above viewpoint and the like, among the conditional ranges defined by the conditional expression (2). Where the conditional expression (2a) is appropriately satisfied, the above described effect can be further increased.

In a structure according to one or more embodiments of the present invention, after the image light L2 emitted from the digital micromirror device DP is totally reflected in the prism unit PU to bend the optical path, the image light L2 passes through the air gap AG3 and is emitted from the prism unit PU to the projection optical system PO, as in the above described projector PJ. Compared with a structure in which the illumination light L1 is totally reflected and is emitted to the digital micromirror device DP, it is easier to form the air gap AG3 for totally reflecting unnecessary light in the above described structure. Thus, a compact prism unit PU can be formed. Further, only one air gap AG3 through which the image light L2 is to pass is required. Thus, image quality degradation can be reduced.

The boundary B1 (FIG. 5) between the non-circular opening A1 and the light blocking portion SP of the diaphragm ST corresponds to the subtense of the arcuate portion, and forms a substantially straight line perpendicular to the reference plane according to one or more embodiments of the present invention. The flare component Δ is more likely to be generated, if the incident angle of the OFF-light L3 to the air gap AG3 is large ($\alpha1<\alpha2$). Therefore, making the boundary B1 a substantially straight line is effective in minimizing the flare component Δ and minimizing decrease in brightness.

REFERENCE SIGNS LIST

PJ Projector (projection display apparatus)
IL Illumination optical system
LN Lens unit
ST0 Diaphragm
PU Prism unit
P1 to P4 First through fourth prisms
AG1, AG2, AG3 Air gap
FR Reflecting optical element
RS Curved reflecting surface
DP Digital micromirror device (reflective image display element)
DS Image display surface
MR Micromirror
MS Pixel reflection surface
L1 Illumination light
L2 Image light (ON-light)
L3 Unnecessary light (OFF-light)
L1p, L2p, L3p Central principal ray
PO Projection optical system
ST Diaphragm
SP Light blocking portion
A0 Circular opening
A1 Non-circular opening
B1 Boundary
XY Reference plane
AX Optical axis
1 Light source device
2 Color wheel
3 Integral rod
R0 Rod exit surface Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

The invention claimed is:

1. A projection display apparatus comprising:
a micromirror device that reflects light on an image display surface to emit image light; a prism unit that comprises a prism and that bends an optical path of the image light emitted from the micromirror device; and
a projection optical system that comprises a diaphragm and that projects the image light emitted from the prism unit onto a screen, wherein
the image display surface is formed with a plurality of micromirrors, and an image is formed on the image display surface through ON/OFF control on a tilt of a surface of each of the micromirrors and intensity modulation on incident light,
the prism unit has an air gap tilted at a predetermined angle with respect to a principal ray of the image light emitted from the center of the image display surface, and the image light emitted from the micromirror device passes through the air gap,
the diaphragm has a non-circular opening in a shape formed by partially cutting off a periphery of a circular opening with an arcuate light blocker that blocks image light corresponding to an end of F-number light flux on a side having a large incident angle with respect to the air gap, and
conditional expressions (1) and (2) below are satisfied, $$0.9\times Cg<G<1.1\times Cg \quad (1), \text{ and}$$

$$(0.2-0.05\times F)<S<(1-0.2\times F) \quad (2), \text{ where,}$$

of the incident light subjected to the intensity modulation on the image display surface, light reflected by a micromirror in an ON-state among the micromirrors is ON-light, light reflected by a micromirror in an OFF-state among the micromirrors is OFF-light, the ON-light is the image light, and a plane including a principal ray of the incident light immediately before entering the center of the image display surface and a principal ray of the ON-light immediately after being reflected is a reference plane, $$Cg=\sin^{-1}(1/N)-(R-\sin^{-1}(1/(2F)))/N,$$

wherein:
  N is a refractive index on a d-line of the prism through which the image light passes,
  R is an angle (in degree) formed when the principal ray of the ON-light and a principal ray of the OFF-light immediately after being reflected at the center of the image display surface are projected onto the reference plane,
  F is the smallest F-number of the projection optical system,
  G is an angle (in degree) of the air gap with respect to a plane perpendicular to the principal ray of the image light emitted from the center of the image display surface,
  S is a light blocking rate forming the non-circular opening of the diaphragm,
  S=t/r, where t is a width of an arc of the light blocker in a radial direction, and r is a radius of the circular opening, and
  S>0.

2. The projection display apparatus according to claim 1, wherein, after the image light emitted from the micromirror device is completely reflected in the prism unit and the optical path is bent, the image light passes through the air gap and is emitted from the prism unit to the projection optical system.

3. The projection display apparatus according to claim 2, wherein a boundary between the non-circular opening and the light blocker of the diaphragm corresponds to a subtense of the arc, and forms a substantially straight line perpendicular to the reference plane.

4. The projection display apparatus according to claim 2, wherein the micromirror device is a single chip including a digital micromirror device.

5. The projection display apparatus according to claim 1, wherein a boundary between the non-circular opening and the light blocker of the diaphragm corresponds to a subtense of the arc, and forms a substantially straight line perpendicular to the reference plane.

6. The projection display apparatus according to claim 5, wherein the micromirror device is a single chip including a digital micromirror device.

7. The projection display apparatus according to claim 1, wherein the micromirror device is a single chip including a digital micromirror device.

8. A method of producing a projection display apparatus that includes: a micromirror device that reflects light on an image display surface to emit image light; a prism unit that comprises a prism and that bends an optical path of the image light emitted from the micromirror device; and a projection optical system that comprises a diaphragm and that projects the image light emitted from the prism unit onto a screen, the method comprising:
  forming the image display surface with a plurality of micromirrors on which an image is formed through ON/OFF control on a tilt of a surface of each of the micromirrors and intensity modulation on incident light,
  providing an air gap in the prism unit, wherein the air gap is tilted at a predetermined angle with respect to a principal ray of the image light emitted from the center of the image display surface, and the image light emitted from the micromirror device passes through the air gap,
  providing, in the diaphragm, a non-circular opening in a shape formed by partially cutting off a periphery of a circular opening with an arcuate light blocker that blocks image light corresponding to an end of F-number light flux on a side having a large incident angle with respect to the air gap, wherein
  conditional expressions (1) and (2) below are satisfied, $$0.9 \times Cg < G < 1.1 \times Cg \qquad (1), \text{ and}$$

$$(0.2-0.05 \times F) < S < (1-0.2 \times F) \qquad (2), \text{ where,}$$

of the incident light subjected to the intensity modulation on the image display surface, light reflected by a micromirror in an ON-state among the micromirrors is ON-light, light reflected by a micromirror in an OFF-state among the micromirrors is OFF-light, the ON-light is the image light, and a plane including a principal ray of the incident light immediately before entering the center of the image display surface and a principal ray of the ON-light immediately after being reflected is a reference plane, $$Cg=\sin^{-1}(1/N)-(R-\sin^{-1}(1/(2F)))/N,$$

wherein:
  N is a refractive index on a d-line of the prism through which the image light passes,
  R is an angle (in degree) formed when the principal ray of the ON-light and a principal ray of the OFF-light immediately after being reflected at the center of the image display surface are projected onto the reference plane,
  F is the smallest F-number of the projection optical system,
  G is an angle (in degree) of the air gap with respect to a plane perpendicular to the principal ray of the image light emitted from the center of the image display surface,
  S is a light blocking rate forming the non-circular opening of the diaphragm,
  S=t/r, where t is a width of an arc of the light blocker in a radial direction, and r is a radius of the circular opening, and
  S>0.

* * * * *